United States Patent [19]

Forstbauer et al.

[11] Patent Number: 4,719,557

[45] Date of Patent: Jan. 12, 1988

[54] APPARATUS FOR GENERATING A SYMMETRICAL THREE-PHASE VOLTAGE SYSTEM WITH A NEUTRAL WIRE CAPABLE OF CARRYING CURRENT

[75] Inventors: Wilhelm Forstbauer; Albert Muller, both of Erlangen, Fed. Rep. of Germany

[73] Assignee: Siemens Aktiengesellschaft, Munich, Fed. Rep. of Germany

[21] Appl. No.: 862,755

[22] Filed: May 13, 1986

[30] Foreign Application Priority Data

May 13, 1985 [DE] Fed. Rep. of Germany ....... 3517175

[51] Int. Cl.$^4$ ............................................. H02P 13/00
[52] U.S. Cl. ......................................... 363/79; 363/98
[58] Field of Search ..................... 363/41, 79, 98, 132; 364/161, 162, 163

[56] References Cited

U.S. PATENT DOCUMENTS

| | | | |
|---|---|---|---|
| 4,214,300 | 7/1980 | Barlow et al. | 364/162 X |
| 4,259,620 | 3/1981 | Oates et al. | 363/41 X |
| 4,367,522 | 1/1983 | Forstbauer et al. | 363/137 |
| 4,502,105 | 2/1985 | Jessee | 363/132 X |
| 4,502,106 | 2/1985 | Glennon | 363/132 X |
| 4,574,340 | 3/1986 | Baker | 363/41 |
| 4,597,037 | 6/1986 | Okado | 363/41 |

FOREIGN PATENT DOCUMENTS

0037001  3/1981  European Pat. Off. .

Primary Examiner—Patrick R. Salce
Assistant Examiner—Marc S. Hoff
Attorney, Agent, or Firm—Kenyon & Kenyon

[57] ABSTRACT

A device which generates a symmetrical output voltage system at the output of a transformer with a neutral point which can carry current on the secondary side or a Y-point former, even if the load is asymmetrical, each primary terminal being fed from a pair of bridge arms of a pulsed inverter. The device further comprises a decoupling network in which the conductor voltages measured on the secondary side are converted into substitute actual values according to the structure of the transformer circuit, which actual values represent symmetrical output voltages or a likewise symmetrical system with a free Y-point. These substitute actual values are controlled to form a system of symmetrical reference values.

9 Claims, 10 Drawing Figures

APPARATUS FOR GENERATING A SYMMETRICAL THREE-PHASE VOLTAGE SYSTEM WITH A NEUTRAL WIRE CAPABLE OF CARRYING CURRENT

BACKGROUND OF THE INVENTION

This invention relates to three-phase voltage apparatus in general and more particularly to an apparatus for generating a symmetrical three-phase output voltage system with a neutral wire capable of carrying current.

In German DE-OS No. 30 12 232, an arrangement is described in which the generated three-phase output voltage system can be maintained symmetrical even under asymmetrical load by a neutral-point load or a single-phase load. It is possible through suitable control to also level out load peaks quickly (for instance, within a half-wave). Harmonic voltages which are generated by low-order harmonic currents due to nonlinear loads at the internal resistance of the inverter arrangement used can also be leveled out. In addition, it is possible to keep the harmonic content below 5% with simple low-pass filters.

In this known apparatus, an inverter arrangement with three a-c outputs is connected to a d-c input voltage. This inverter arrangement contains a separate four-pulse bridge circuit (B4-inverter) for each a-c output, i.e., a total of 12 main inverter branches. The a-c voltages generated thereby are connected to a voltage transformation device which consists of three single-phase transformers. The primary windings of the transformers are connected to the single-phase a-c voltages of the B4 inverter bridges, while the secondary windings are tied together at one end in a Y-point which can carry current, and the other ends represent the terminals of the three-phase output voltage system. There is further provided a filter which consists of inductors and capacitors and precedes or follows the voltage transformation device. The individual elements of this filter which is connected in series with the voltage transformation device, however, can also be arranged differently. For instance, the inductors can be connected in series with the voltage transformation device on the primary side, while the capacitors, in a Y or delta connection, can be connected on the secondary side.

In order to control the generated output voltage system with the above-mentioned property, a control section operating with means for vector analysis is provided in which a vector oscillator used as a reference value setter sets a symmetrical three-phase system of reference vectors. Each of these reference vectors is compared, in a separate control device associated with one a-c output of the inverter arrangement, with a corresponding actual vector in order to thereby provide outputs to the individual B4 bridge circuits.

In its control section, this known arrangement is not only relatively costly but additionally requires a total of 12 main inverter branches. It is, thus, an object of the present invention to improve this apparatus especially with respect to the power section while the above-mentioned advantageous properties are retained. In particular, a rapid and accurate control of the symmetrical output voltage system should be possible.

SUMMARY OF THE INVENTION

This object is attained by the present invention with an inverter arrangement comprising a pulse width-controlled, six-pulse bridge pulse inverter with pairs of bridge arms; a decoupling network which simulates the structure of the voltage transformation device having as inputs values which correspond to the conductor voltages at the output of the series circuit, for forming simulated instantaneous values which correspond to the voltage system at the input of the voltage transformation device; and a control device and decoupling network coupled together such as to furnish, from the reference values and from measured values for the conductor voltages of the output voltage system, control voltages for the pairs of bridge arms which work on a respective output of the inverter arrangement, whereby deviations of the simulated measurement values from the reference value can be leveled out by the control voltages.

DETAILED DESCRIPTION

Figure 1:
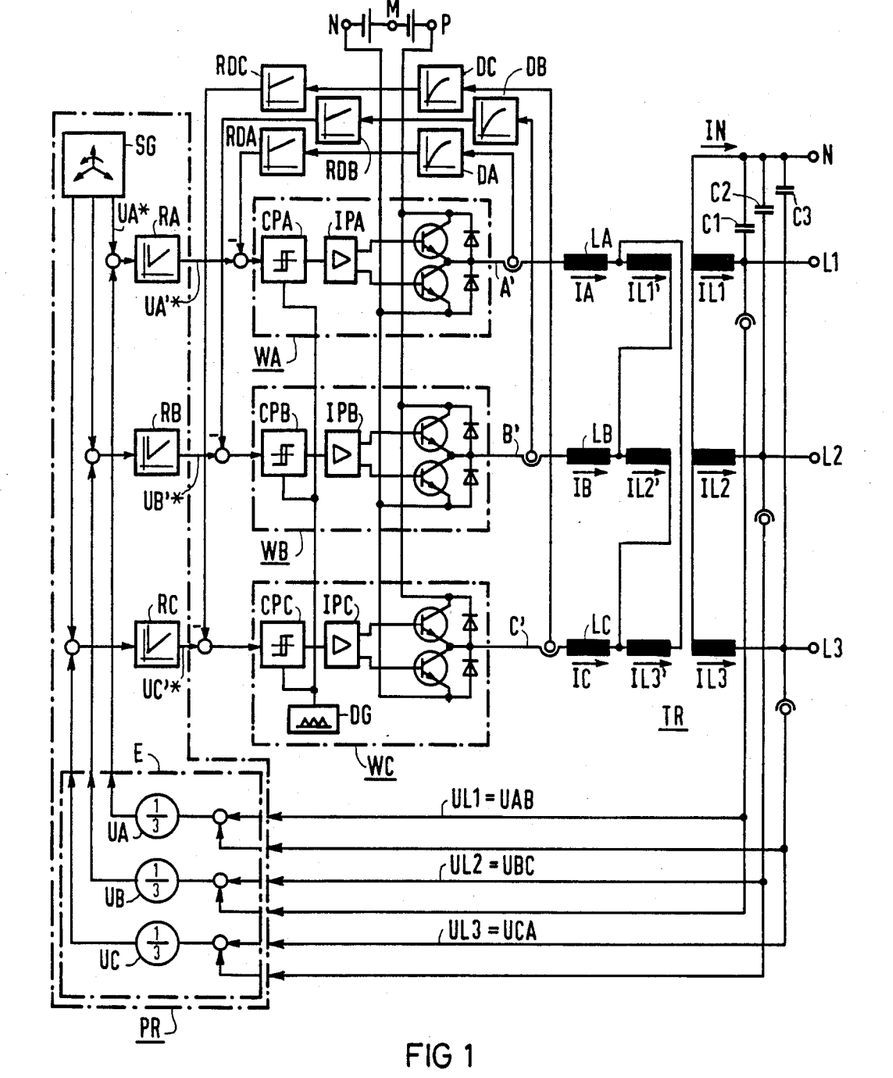
FIG. 1 shows the power section of apparatus in accordance with the present invention with a first embodiment of control section.

In FIG. 1, the output terminals L1, L2 and L3 have applied thereto conductor voltages UL1, UL2 and UL3 measured relative to the neutral wire (Y-point N) which can carry current. The neutral wire N is taken off at the Y-point of the secondary winding of a three-phase transformer, the primary windings of which are delta-connected. If no potential separation is necessary, a conventional Y-point former can also be used but other voltage transformation devices are also possible (for instance, a three-phase transformer with a Y-connection on the primary side without a connected Y-point).

LA, LB and LC are inductors and C1, C2 and C3 the capacitors of a filter. In the illustrated embodiment the inductors are connected in series with the primary windings of the voltage transformation device TR. The capacitors, which are preferably connected to the secondary windings, may also be arranged in a delta circuit between the individual terminals of the output voltage system instead of in the Y-circuit shown.

In the inverter arrangement WA, WB and WC for feeding the voltage transformation device TR, respective B4 bridge circuits are not provided. Instead, only 2 bridge arms work into a primary a-c voltage terminal A', B' or C' of the transformation device TR or its series-connected filter elements. These two bridge arms are controlled so that they switch the associated a-c voltage output alternatingly to the input terminals P and N of the d-c input voltage, with which a fictitious voltage neutral point M is shown in FIG. 1, at a high, preferably constant, clock frequency.

In order to form the alternating driving pulses for the bridge arms, a delta generator DG generates a high frequency keying voltage which is fed to respective separate control units for each pair of bridge arms working into a common a-c voltage output. In these control units which are shown in the block diagram as comparators CPA, CPB and CPC, control voltages UA'*, UB'* and UC'* associated with the outputs A', B' and C' are pulse-width modulated by the keying voltage. The pulse-width-modulated control voltage is then converted in pulse evaluation stages IPA, IPB and IPC, shown as amplifiers in the block diagram, into the corresponding firing pulses for alternatingly driving the bridge arms.

In order to avoid saturation of the transformer, common-mode components occurring at the terminals A', B' and C' are leveled out. Therefore, common-mode determining devices DA, DB and DC are provided which are followed by respective common mode regulators RDA, RDB and RDC, the output signals of which are superimposed on the control voltages UA'*, UB'* and UC'* at the input of the comparators.

The design of the inverter arrangement with three pairs of bridge arms associated with a terminal A', B' or C' corresponds to the normal design of a pulsed inverter. In order to rapidly level out short-time asymmetries occurring at the terminals L1, L2 and L3, it is essential that each pair of these bridge arms be addressed by a control unit of its own with a control voltage which can be varied rapidly.

This purpose is served by the control section PR which is indicated only schematically in FIG. 1 and the advantageous design of which will be explained with reference to the further Figures.

As compared with the known apparatus mentioned at the outset, the number of required bridge arms in the output section is halved and considerable savings are thereby obtained. To replace the known inverter arrangement which consists of three individual B4 inverters, by such a B6 pulse inverter, however, does not seem possible at first glance.

For, such a pulsed inverter has no Y-point that can carry current at its output and therefore, furnishes only a system of currents which has no zero component. For its output currents IA, IB and IC, we therefore, have $(IA+IB+IC)=0$, so that the current system feeding the transformer TR has only two degrees of freedom. If a symmetrical voltage system is applied to the outputs of the entire apparatus, the currents flowing through the capacitors C1, C2 and C3 cancel each other. However a load which is connected, for instance, only between two terminals or between one terminal and the neutral wire N results in different currents IL1, IL2 and IL3 being taken from the individual primary windings where a current $IN=-(IL1+IL2+IL3)$ can flow in the neutral wire N. The system of the output currents therefore has 3 degrees of freedom and the different secondary currents have the effect that the primary windings and thus, the outputs A', B' and C' will also be loaded asymmetrically in a manner which depends on the instantaneous magnitude and arrangement of the load. The system of voltages present on the conductors L1, L2, L3 and N also has itself 3 degrees of freedom and, therefore, 3 actual values which can adjust themselves freely in accordance with the instantaneous parameters of the load, and the currents taken from the transformation device and can be reduced to actual values for the conductor voltages (voltages between one conductor L1, L2 or L3, respectively, and the mutual wire N). The desired symmetrical voltage system, however, has only 2 degrees of freedom. Therefore, the 2 degrees of freedom of the primary currents must be set so that the 3 degrees of freedom of the secondary currents adjust themselves exactly so that the third degree of freedom is leveled out in the output voltage system, taking into consideration the instantaneous load parameters.

Since, however, these parameters can change randomly, it appears at first that distortions in the desired symmetrical output voltage system can be suppressed by the inverter arrangement at most if corresponding information regarding the instantaneous load state were available. Since in addition, any change of one of the secondary currents, IL1, IL2 or IL3 is accompanied by a change of the interlinked currents IAB, IBC and ICA flowing into the primary windings and therefore, by a change in several of the supplying currents IA, IB and IC, it is also completely unclear at first how information regarding the load state, if it were available, would have to be processed in the control of the three pairs of bridge arms.

The present invention will operate essentially without the mentioned information regarding the exact instantaneous load state. According to FIG. 1, only the voltage system at the terminals L1, L2, and L3 which is to be kept symmetrical even under changing and asymmetrical loads, is measured.

Figure 2:
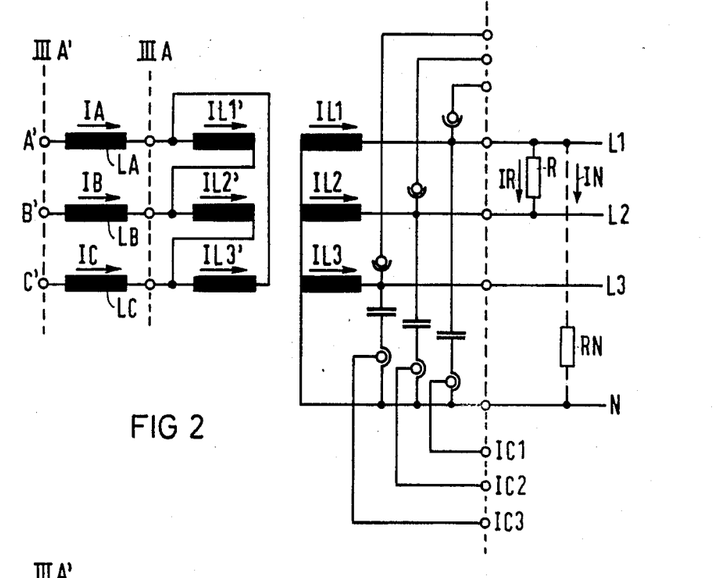
FIG. 2 illustrates a design of the voltage transformation device with a transformer with a delta-Y circuit and a filter.

In the interest of a fast readjustment of these terminal voltages, it may also be necessary to measure the current flowing through the capacitors of the filter. The current-measuring members which in principle are not needed and are provided only for a further embodiment of the present invention are therefore, not shown in FIG. 1 but for the sake of completeness are shown in FIG. 2 which depicts the design of the filter and the transformation device which may be implemented, for instance, as a transformer in delta-Y connection. However, these capacitive currents and the capacitors themselves are of no importance for the further explanation of the present invention, so that they will not be considered further for time being.

For, if a load RN ("neutral point load", FIG. 2) is connected, for instance, between L1 and N, the load current IN is equal to the current in the neutral conductor and is conducted as the secondary current IL1 past the capacities if the control is successful, the output voltage system remains symmetrical. Since in the case of this neutral point load, we have IL1=IL3=0, the secondary current IL1 is generated by a primary current IL1' which must be made available according to IL2'=IL3'=0 as an interlinked current IAB=IA=-IB at the outputs A' and B' of the inverter arrangement.

If on the other hand, a single-phase load R is connected between the terminals L1 and L2, then one has IL3=0, IL1=IR=-IL2 and the currents can be converted into corresponding primary currents IL3'=0, IL1'=IA and IL2'=-IC with IB=-IA-IC, taking into consideration the turns ratio of the transformer.

Figure 3:
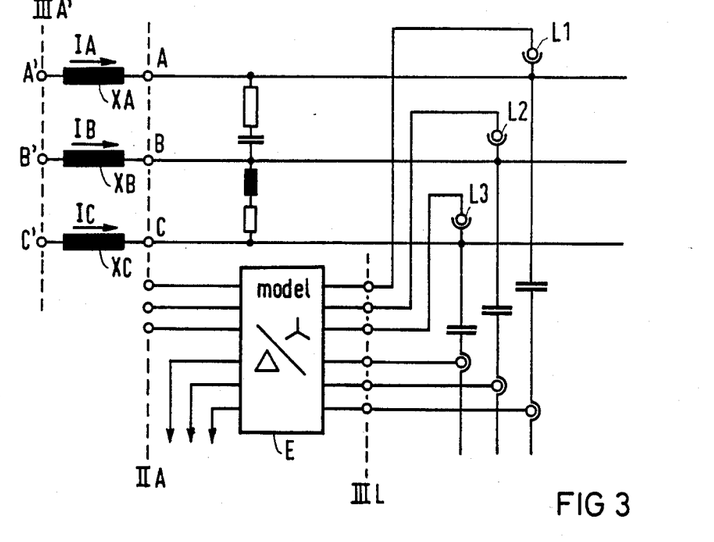
FIG. 3 is a drawing which explains the structure of the arrangement according to FIG. 2 and its simulation in a decoupling network.

If the impedances of the transformer and therefore, the voltage drops caused at its primary terminals are added to the impedances LA, LB and LC of the filter and its voltage drops, the equivalent circuit shown in FIG. 3 is obtained for the case of single-phase loads, in which the load R connected interlinked on the secondary side appears between the terminals A, B and C as an RC and an RL member.

A neutral point load on the secondary side also acts like a load between two phases on the primary side. Similarly, the conductor voltages U11, U12 and U13 at the terminals L1, L2 and L3 can also be recalculated into corresponding interlinked voltages UAB, UBC and UCA between the terminals A, B and C.

This recalculation is accomplished in FIG. 3 by a module E designated as a "model" which therefore, simulates the structure of the transformation device, i.e., represents the functional relationship between the output variables of the Y-circuit on the secondary side and the input variables of the delta-circuit on the primary side for the idealized case where the transformer has no inductance and its inductances are added to the inductances of the filter in such a manner that the inductive voltage drops caused by the primary currents appear at the inductances XA, XB and XC alone.

The model E, therefore, simulates ultimately only the "d-c structure" which is obtained from the equations for their electrical variables at the metallic nodes of the transformation device, taking into consideration the number of turns, and supplies, for instance, interlinked substitute measuring variables UAB, UBC and UCA for the interlinked voltages at the model input, A, B, and C free of neutral conductors of the model transformer which is assumed to have no inductance. The inductive loads connected with the inductances of the transformer ("inductive structure") and the filter inductances then appear as inductive voltage drops at the inductances XA, XB and XC, i.e., as load-dependent voltage differences UA' −UA; UB' −UB' and UC' −UC between the voltages referred to the fictitious free neutral point M of the at the inverter outputs A', B' and C' on the one hand, and substitute measurable variables UA, UB and UC on the other hand, which indicate the model voltages at the model terminals A, B and C of the induction-free model transformer, referred to the fictitious Y-point M.

The module E, therefore, represents a decoupling network which permits recalculating the measurement variables linked on the secondary side to the load-carrying Y-point into substitute measuring variables of a system without a neutral conductor. This decoupling network, while it is independent of the inductive parameters of the transformer, has to consider the circuit structure of the voltage transformation device and is different in its design for the delta-Y transformer under consideration than, for instance, for a transformer which has a free floating Y-point on the primary side.

If now, according to the actual arrangement in FIG. 2, the actual voltages at the inverter outputs A', B' and C' are represented in different voltage planes as the voltage system IIIA' or at the terminals L1, L2, L3 and N as the output voltage system IIIL and at the terminals of the transformation device as the voltage system IIIA, the voltage systems IIIA' and IIIL must be preserved as the actual values in the equivalent circuit according to FIG. 3, but the voltage system IIIA is replaced by the equivalent voltage IIA calculated by the decoupling network E, in a voltage plane (which is not accessible for measurement and is fictitious). If the voltage system IIIL is symmetrical, then also IIA is symmetrical and vice versa. Distortion, caused by instantaneous load changes, of the symmetry in IIIA also occurs here as distortion in the voltage system IIA. This becomes clear by making reference to FIGS. 4 and 5.

Figure 4:
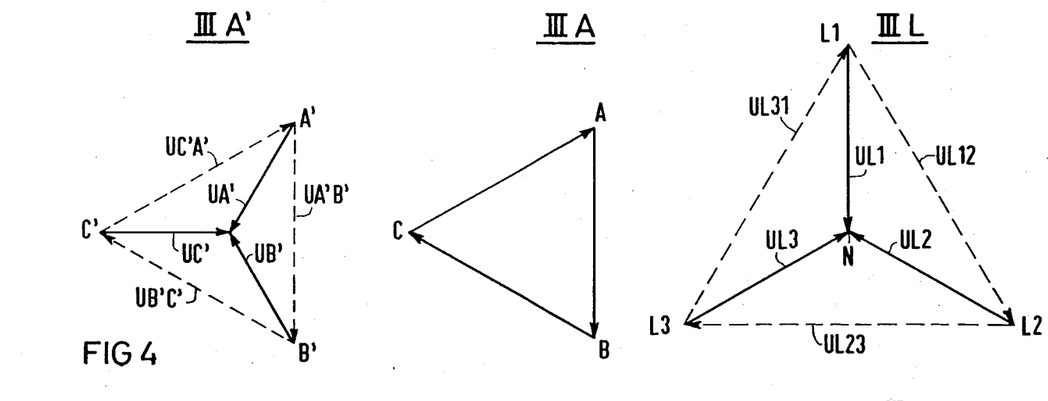
FIGS. 4 and 5 illustrate the voltages occurring in different voltage planes with symmetrical and asymmetrical load.

In FIG. 4, a symmetrical load is initially assumed. With regard to the fictitious null point M of the d-c input voltage, the inverter arrangement impresses the symmetrical conductor voltages UA', UB' and UC'. This leads in the voltage plane IIIA' to the symmetrically interlinked voltages (UA'B', UB'C, and UC'A') which, due to the assumed symmetrical load at the input terminals of the transformer leads to the likewise symmetrical system IIIA of the interlinked voltages. In the voltage plane IIIL, the symmetrical primary currents IL1, IL2 and IL3 lead to conductor voltages UL1, UL2 and UL3 on the secondary side or the interlinked voltages UL12, UL23 or UL31, a turns ratio of 1:1 being assumed here. The system IIIL is symmetrical.

Figure 5:
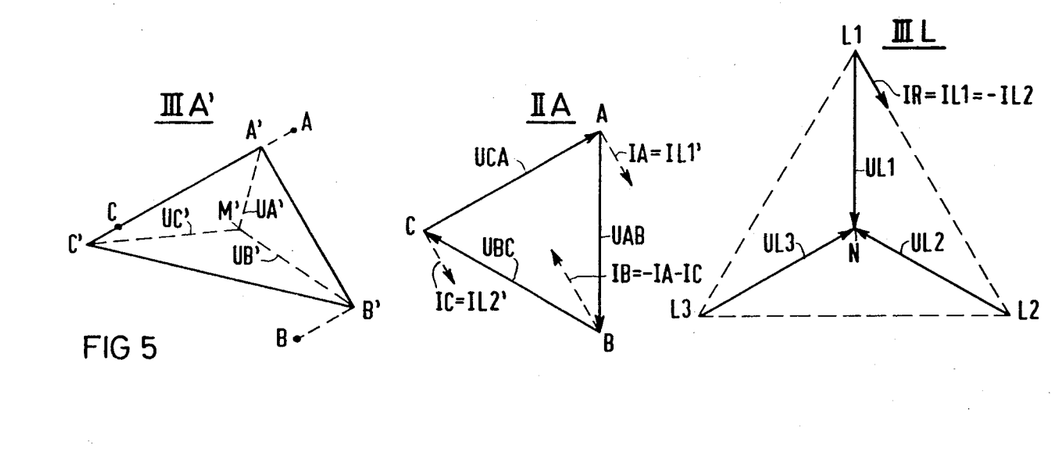

If now the load R with the load current IR is connected between the terminals L1 and L2 and at the same time, the voltage system IIIL is kept symmetrical by the control of the inverter arrangement, the voltage plane IIIL remains unchanged according to FIG. 5. The load current IR is shown as an arrow in the direction of the interlinked voltage UL12. According to the equivalent circuit of FIG. 3, and the calculation of the equivalent actual values following therefrom the system IIA is, also symmetrical; otherwise, the method according to the present invention would lose its base.

The already explained recalculation of the currents, however, results in the arrows given in FIG. 5 in the voltage plane IIA for the output currents IA, IB and IC of the inverter arrangement. These currents can flow only if, at the impedances XA, XB or XC of FIG. 3, voltage drops occur which are represented by the spacings A'A, B'B and C'C in the voltage system IIIA' of FIG. 5. The voltages UA', UB' and UC' which are referred to the fictitious neutral point M' of the d-c input voltage, therefore, represent an asymmetrical system. For the inverter arrangement this means that an asymmetrical voltage system must be generated at its a-c outputs by setting an asymmetrical system of control variables so that, according to the respectively prevailing load distribution, a symmetrical voltage system can occur in the planes IIA and IIIL.

For this purpose, the method created by the present invention provides the following: the decoupling network E which simulates the structure of the voltage transformation device, first forms simulated instantaneous values (UA, UB and UC in FIG. 1) from instantaneous values which correspond to the conductor voltages UL1, UL2 and UL3 at the output of the voltage transformation device TR. Thereby, substitute actual values of a (fictitious) voltage system IIA are ready for the control at the input of the (idealized) voltage transformation device. The deviation of every substitute actual value from a reference value set by a symmetrical reference value system can now be leveled out by a respective separate control device which controls the pair of bridge arms of the B6 pulse converter associated with the substitute actual value.

The control voltages UA'*, UB'* and UC'* formed in the process are then asymmetrical and lead to the voltages UA', UB' and UC' shown in FIG. 5. The same asymmetrical control of the control devices, however, is also obtained if the decoupling is arranged not between the measuring members for the real actual values UL1, U12 and UL3 and the actual value input of the control devices, but if initially symmetrical reference values are set-in directly for the conductor voltages (or also the interlinked voltages) in the voltage plane IIIL and only subsequently, the control output variables generated by the control comparison are recalculated in the decoupling network E into the corresponding control voltages VA'*, VB'* and UC'*.

In viewing FIG. 5, it is found that UAB=UL1, UBC=UL2 applies for an assumed turns ratio 1:1 of the transformer. For the fictitious terminal A, the terminal voltage referred to the fictitious neutral point of the system IIA is given by UA=⅓(UL1−UL2)=⅓(UAB−UBC). Note that the foregoing relationship can be more clearly ascertained from the network E representation in FIG. 1 in which the "⅓" circles represent amplifiers each having multiplication factors of ⅓. This substitute actual value can thus be compared at the input of a controller RA with a corresponding reference value UA* in order to feed the comparator CPA for the pair of bridge arms WA with the controller output voltage UA'* (FIG. 1). The same applies for the other pairs of bridge arms WB and WC of FIG. 1, the reference values UA*, UB* and UC* being set in by a reference value setter SG as a symmetrical system. Thus, the structure of the decoupling network E and the control section PR given in FIG. 1 is obtained. The controls RA, RB and RC are designed in the first embodiment of the control section PR shown in FIG. 1 as differentiating controllers with proportional and integral components (PID controllers).

The optimum design of the controller follows from the requirement of a control as accurate and fast as possible and can be derived from the structure of the overall device.

Figure 6:
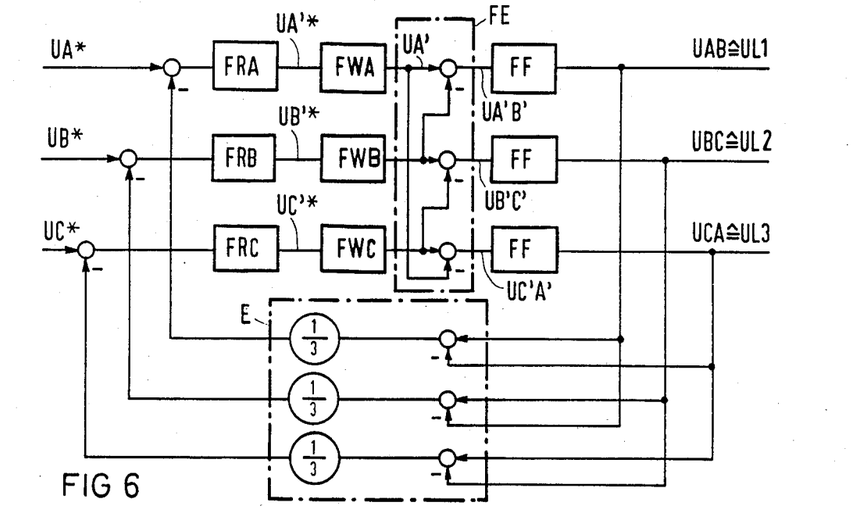
FIG. 6 is a block diagram of the three-phase control circuit.

FIG. 6 shows the structure of the control for all three phases where the transfer functions of the respective control devices are designated as FRA, FRB and FRC and the transfer function of the pairs of bridge arms as FWA, FWB and FWC. The voltage transformation device RT is represented by a coupling network FE, wherein the influence of the filter and the transformer inductances is taken into consideration by an appropriate transfer function FF.

Figure 7:
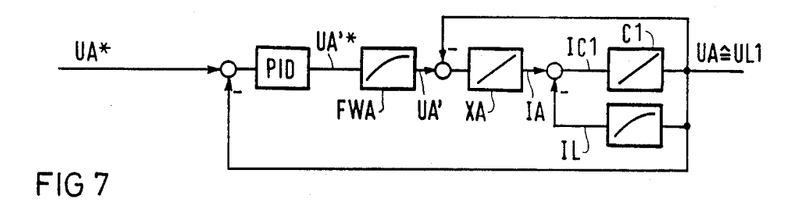
FIGS. 7, 8 and 9 show different embodiments for the single-phase control circuits in the block diagram of FIG. 6.

Since the influence of the coupling network FE is canceled by the decoupling network E, the control processes for the individual pairs of bridge arms can be disentangled. In FIG. 7, the pair of bridge arms FWA is assumed to be a firstorder smoothing member, at the output of which the voltage UA' is present. According to FIG. 3, the inductance XA is shown as an integrator for the inductive voltage drop UA'−UA. The current IA formed thereby flows partly as the load current IL into the load which is represented approximately by a smoothing member. The current IC=IA−IL flowing through the capacitor C1 then leads, in accordance with an integration operation, to the voltage UL1 which corresponds to the voltage UA.

The stability of this control circuit requires that a differentiating controller be employed as the controller PID, to which a P-component and, for increasing the accuracy, advantageously also an I-component are added, in order to control the actual value UL1 in accordance with the desired value UA*.

The use of a controller with a D-component is not always advantageous. Since, however, the capacitor current IC1 represents, as the input variable of C1, the differential of the voltage UL1, the D-component of the control circuit can be realized by providing that the difference UA*−UA is fed to a voltage controller PI without a D-component on the output signal of which the measured value of the capacitor current IC1 is impressed. The output signal of the voltage controller then indicates the reference value IC1* of the capacitor current (FIG. 8) and the controller deviation IC1* - IC 1 is levelled-out by a subordinated current controller which may be a pure amplifier stage VRI (proportional controller).

Figure 8:
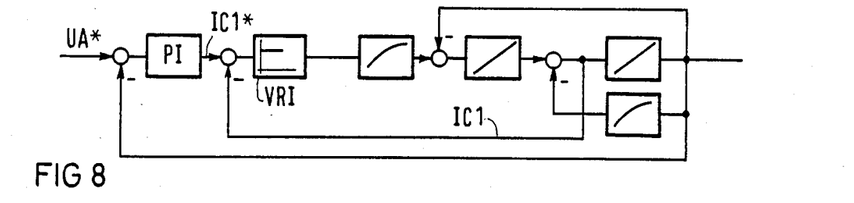

The operation of the control circuits according to FIGS. 7 and 8, is almost identical.

The absolute error of the control can be reduced still further if the output signal of the voltage controller is pilot-controlled by the capacitor current as well as the the capacitor voltage. According to the advantageous structure according to FIG. 9, a proportional controller VRU is used as the voltage controller, to the output signal of which a pilot control value ICV for the capacitor current is added. A nominal value $U_N$ of the output voltage at a frequency results in a nominal current $\omega C \times U_N$ which leads the voltage by 90° through a capacitor with the capacitance C. For the present actual or reference value of the voltage, a pilot control value ICV which leads the reference value UA* correspondingly and the amplitude of which is set, for instance, by $\omega C \times U_A^*$ can be formed. As the pilot control variable UCV for the capacitor voltage, the voltage reference value UA* can be connected to the control voltage UA'* formed by the current controller VRI.

Figure 9:
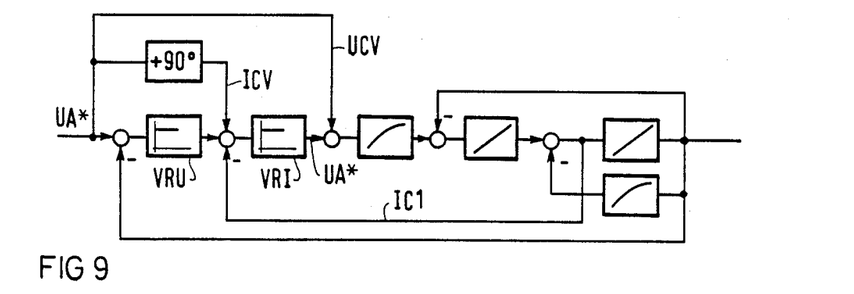
Figure 10:
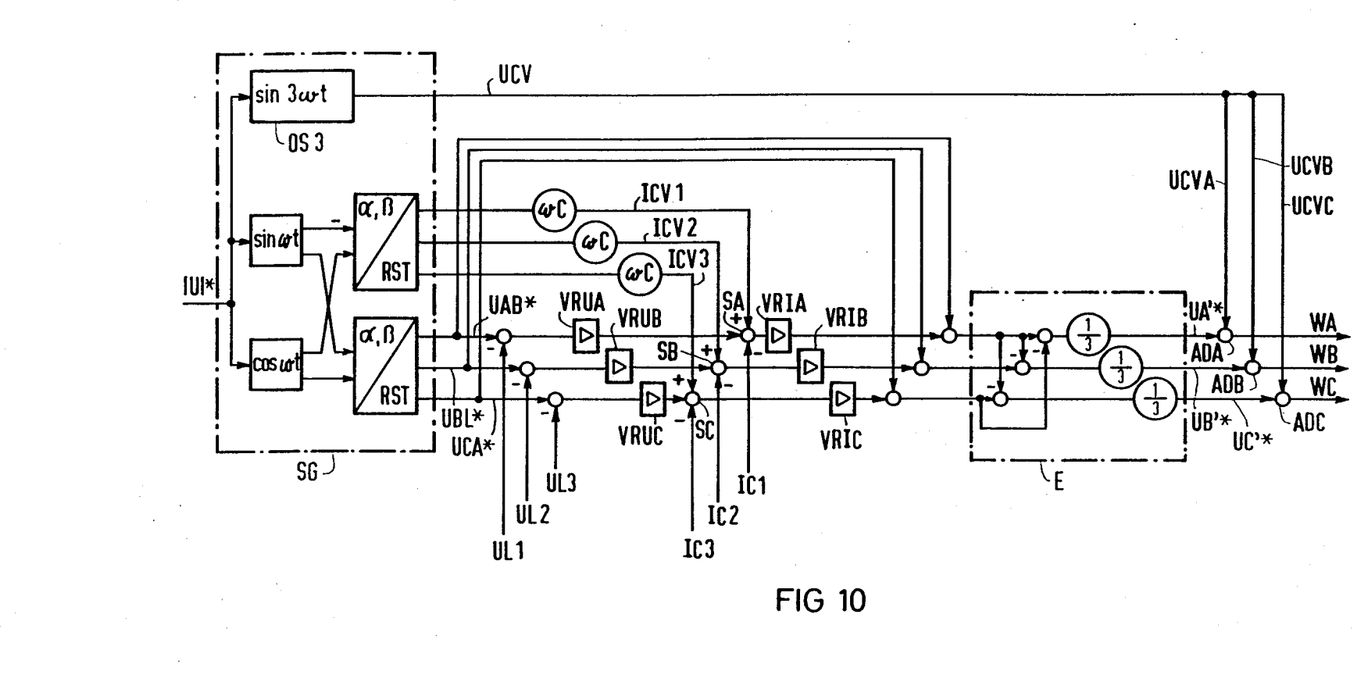
FIG. 10 illustrates an advantageous design of the control section for the output stage shown in FIG. 1.

In FIG. 10, a control section is shown which is modified from the control section PR shown in FIG. 1 and is obtained from the individual control circuits of FIG. 9. The reference value setter SG accordingly consists of two oscillators which generate two waves phase-shifted 90° with a desired frequency of the output voltage system and the amplitude U*. Two pairs of numbers (U*cosωt, U*sinωt) and (−U*sinωt, U*cosωt) formed thereby are conceived as the orthogonal components of a first reference vector and a second reference vector leading the first by 90°, from which RST coordinate converter each then forms the projections onto 3 axes phase-shifted relative to each other by 120°.

The projections of the first vector then furnish reference values UAB*, UBC* and UCA* which thus represent a symmetrical reference value system. The control deviations of the instantaneous actual values UL1, UL2 and UL3 from these reference values are amplified in the voltage controllers VRUA, VRUB and VRUC and fed to the subtraction points SA, SB and SC. To these subtraction points are fed on the one hand the measured values of the capacitor currents IC1, IC2 and IC3 already determined according to FIG. 2, but on the other hand, also the corresponding pilot control values ICV1, ICV2 and ICV3 which are formed by multiplication from the projections of the other reference vector. The subtraction signals obtained thereby are amplified in the current controllers VRIA, VRIB and VRIC to form control variables for the inverter output voltage, to which the voltage reference values UAB*, UBC* and UCA* are added as pilot control variables UCV at subsequent addition points.

Deviating from the control section PR of FIG. 1, the voltage control for the control voltage system IIIL is provided in FIG. 10. The decoupling network E is stored here not by the actual value system IIIL but by the system of the pilot-control variables. While it has the design already given in FIG. 1, it is now arranged in the control variable channel for the control variables UA', UB' and UC' instead of in the actual-value channel of the control section PR. Its output variables UA'*, UB'* and UC'* are fed to the control units of the pairs of bridge arms WA, WB and WC as control voltages for these control variables.

The entire further part of the device can be taken from FIG. 1 without change.

Advantageously, a third-order harmonic synchronized with the signal U*sine the control voltages for the pairs of bridge arms which are sinusoidal in the steady-state case to approach trapezoidal shape. The reference-value setter SG therefore contains a further oscillator OS3 with tripled frequency, the output signal of which is added to the outputs UA'*, UB'* and UC'* of the decoupling network E.

The synchronized superimposed third harmonic does not change the amplitude of the inverter output voltages used as control variables; however, it generates currents which do not have this third harmonic and have a correspondingly higher amplitude in the transformer windings. Thereby, the efficiency of the power transmission in the inverter arrangement can be increased. The present invention can be used, for instance, in a power supply free of interruptions, to feed the secured bus from a battery or to feed energy into an insular network from a solar generator, a fuel cell or another d-c voltage source. Since the present invention starts from instantaneous values which are converted practically without delay into substitute actual values, a very rapid actual value control is thus possible, by which not only a symmetrical network is assured even with asymmetrical load but where load peaks can be leveled out within settling times which are less than a half-period of the wave. In particular, simple lowpass filters by which the harmonic content can nevertheless be pushed below 5% can be used as filter elements.

In the voltage control circuit of FIG. 10, a voltage measuring arrangement measures the instantanous values UL1, UL2, UL3 to be compared with the reference values UAB*, UBC*, UCA*. But these reference values are just another representation of the same symmetrical reference system given by the two values |U|*sinωt and |U|*cosωt. Therefore in general, it is sufficient to take only two instantaneous values as representatives of the instantaneous value system. For example, in FIG. 10 the values UL2 and UBC* and, consequently, the elements VRUB, SB and VRIB may be omitted.

On the other hand, the control units for the pair of bridge arms need three individual control voltages UA'*, UB'*, UC'*. In consideration of the fact, that the inverter is only able to change two voltages independently and the third voltage is given by a function of the others—for example the linked voltage UB'C' is given by —(UA'B'+UC'A') the decoupling network E may in this case be completed by an algebraic structure to simulate the voltages UA'*, UB'*, UC'*.

This reduces the number of elements needed for the control structure shown in FIG. 6 and FIG. 10.

What is claimed is:

1. A device for generating a symmetrical three-phase output voltage system with a neutral conductor which can carry current, comprising:
   (a) pulse width controlled, six-pulse bridge pulse inverter with a inverter arrangement providing three a-c outputs, each a-c output connected to a pair of bridge arms;
   (b) a separate control unit for each of said pairs of bridge arms, said separate control unit being controlled by a corresponding control voltage;
   (c) a voltage transformer device, having its inputs connected to the outputs of the inverter and having outputs forming the output system with a neutral conductor;
   (d) a filter coupled in series w1th said voltage transformer device;
   (e) a voltage measuring arrangement for measuring an instantaneous value system of said symmetrical output voltage system:
   (f) a reference-value setter for feeding a symmetrical system of reference values into reference inputs of a voltage control device, said voltage control device determining said control voltages of said control units and having instantaneous value inputs connected to said voltage measuring arrangement, and
   (g) a decoupling network which simulates the structure of the voltage transformer device having as inputs values which correspond to said instantaneous value system for forming simulated instantaneous values which correspond to a voltage system at the input of the voltage transformer device; said voltage control device and said decoupling network coupled in series between said voltage measuring arrangement and said control units.

2. A device according to claim 1 wherein said voltage transformer device comprises a potential-free three phase transformer with a Y-point circuit on the secondary side or a Y-point former.

3. A device according to claim 1 wherein the instantaneous value inputs of the voltage control device are connected to the outputs of the voltage measuring arrangement and the decoupling network comprises subtraction means, the inputs of said subtraction means being fed with output values of the voltage control device and the outputs of said subtraction being connected to the control circuits.

4. A device according to claim 1, wherein said filters are lowpass filters

5. A device according to claim 1 and further including means to superimpose a third-order harmonic on control variables for the output voltages of the pairs of bridge arms to approximate a trapezoidal shape.

6. A device according to claim 1 wherein said control device includes PID control means.

7. A device according to claim 1 wherein said control means each include a superimposed P or PI controller, having the difference of a reference value and a measured or simulated instantaneous value as input and the output signal of which represents the reference value for a capacitor current; means for comparing said outputs with an actual value taken off at the capacitor; and a subordinated current controller to which the output of said means for comparing is coupled.

8. A device according to claim 7, and further including means forming a pilot variable from the reference value of said controller and means for phase-shifting said value 90°, said phase-shifted pilot variable additively coupled to the output of said superimposed controller.

9. A device according to claim 7, and further including means for coupling a pilot control value formed from the reference value of the superimposed controller, to the output signal of said subordinated controller.

* * * * *